United States Patent [19]

Bentzley

[11] Patent Number: 5,042,187
[45] Date of Patent: Aug. 27, 1991

[54] BRINE SHRIMP HARVESTER

[76] Inventor: Patrick Bentzley, 184 E. North Sandrun Rd., Salt Lake City, Utah 84103

[21] Appl. No.: 416,015

[22] Filed: Oct. 2, 1989

[51] Int. Cl.⁵ ............................................. A01K 81/04
[52] U.S. Cl. ............................................. 43/6.5; 43/8
[58] Field of Search ............... 210/242.3, 923; 43/6.5, 43/8; 209/633, 935, 674

[56] References Cited

U.S. PATENT DOCUMENTS

| | | | |
|---|---|---|---|
| 1,138,541 | 5/1915 | Conekin | 43/6.5 |
| 1,486,485 | 3/1924 | Frissell | 43/6.5 |
| 1,619,560 | 3/1927 | Blecker | 43/6.5 |
| 1,717,835 | 6/1929 | Calhoun | 43/6.5 |
| 3,091,880 | 6/1963 | Puretic | 43/8 |
| 3,360,881 | 1/1968 | Blount | 43/8 |
| 3,469,819 | 9/1969 | Puretic | 43/8 |
| 3,775,890 | 12/1973 | Puretic | 43/6.5 |
| 3,913,254 | 10/1975 | Puretic | 43/6.5 |
| 4,086,717 | 5/1978 | Aucoin | 43/6.5 |
| 4,663,879 | 5/1987 | Bergeron | 43/6.5 |

*Primary Examiner*—Kurt Rowan
*Attorney, Agent, or Firm*—Trask, Britt & Rossa

[57] ABSTRACT

An apparatus for harvesting floating brine shrimp colonies from open water is disclosed. The apparatus includes a boat fitted with a driven roller arrangement adapted to engage and retrieve a floating boom positioned to enclose the subject shrimp colony. A conveyor belt fitted with a plurality of net-fitted frames is also mounted on the boat and is positioned to receive and filter the shrimp from the water as the roller arrangement tightens the boom enclosure about the shrimp colony and thereby directs that colony into proximity of the conveyor and its net-fitted frames.

11 Claims, 9 Drawing Sheets

BRINE SHRIMP HARVESTER

BACKGROUND OF THE INVENTION

1. Field

This invention relates to apparatus for removing substances, animal life, or materials which are floating at or near the surface of a body of water. More specifically, this invention is directed to an apparatus for use in harvesting brine shrimp.

2State of the Art

Brine shrimp of the genus *Artemia*, and specifically of the species *Artemia salina*, are primitive crustaceans which normally live in bodies of water having a high saline content. Most notably, this form of marine life is found in the Great Salt Lake in Utah and similar lakes and ponds throughout the world.

For many years it has been recognized that the eggs of these crustaceans are capable of withstanding drying conditions for long periods of time. In fact, it has been found that eggs removed from water for over three years will hatch upon their being returned to water. This capacity has led to significant commercial interest in harvesting brine shrimp eggs and thereafter using them either for food for aquarium fish or for use in commercial fish farm operations.

Brine shrimp together with their eggs, which will jointly be referred to hereinafter as "brine shrimp," are usually found in colonies or communities which form floating masses on the surface of bodies of water. In order to make harvesting of the shrimp cost beneficial, it is necessary to concentrate a large number of individual brine shrimp colonies into a single large colony or mass.

Brine shrimp eggs are of sufficient size that they are retrievable from the water by use of nets or similar apparatus. The conventional approach in brine shrimp harvesting has involved the placement of one or more fences in the water adjacent to the shore of a body of water. The fences form a boundary or barrier for the shrimp and thus function to trap or direct the shrimp as the tide or wind causes the shrimp colonies to be pushed toward shore. The fences tend to concentrate the smaller shrimp colonies into a sufficiently large and concentrated mass so as to permit cost-effective harvesting. As the shrimp colonies are driven to the shore, the harvesters, using hand-held nets or shovels, scoop the shrimp from the water or the shore and place the shrimp into storage containers.

Observably, the conventional approach is far from effective. The harvester is at the whim of the wind and the tide as far as bringing the shrimp to the harvesting site. Recognizing that the wind or tide could bring the shrimp colony ashore at any of a number of locations, the harvester's success is often dependent on factors outside of his personal control. To improve the effectiveness of this harvesting approach, extensive fencing structures, positioned to extend outward from the shore, and operate to direct incoming shrimp colonies to preselected harvesting sites have been constructed. Understandably, these structures are exceedingly expensive.

Another problem in the conventional approach is the requirement that the harvester have access to extensive areas of shoreline. In order to construct the fencing structures, one must either lease or own large areas of shoreline. This makes harvesting not only expensive, but further, may make harvesting impossible, if shoreline landowners are unwilling to lease or sell their property.

There exists a need for a means and method for harvesting brine shrimp which eliminates the need for expensive shoreline fencing and which further permits the harvester to take advantage of the large shrimp communities which are found naturally off shore.

SUMMARY OF THE INVENTION

The invention of this disclosure is an apparatus adapted for mounting on a marine vessel such as pontoon boat. The invention may also include the apparatus in conjunction with a boat specifically adapted for the apparatus' operation.

The apparatus includes a boom retrieval means adapted for engaging an elongate boom which has been floatingly positioned about a shrimp colony to be harvested. The boom has been initially placed to circumscribe the colony and in doing so forms a substantially closed perimetered enclosure. This boom enclosure defines an outlet port between the opposing ends of the boom. The boom is fabricated of a material of a sufficiently tight weave or structure that the boom forms a substantially solid fencing enclosure for the brine shrimp. Stated otherwise, when the boom is positioned about the shrimp colony, the boom forms a corral or boundary about the colony.

The boom retrieval means is adapted to engage the opposing ends of the boom. The opposing boom ends are held spacedly apart from one another by the retrieval means, the area between these ends thereby continuing to define an outlet port from the boom perimetered enclosure. The retrieval means is adapted for drawing the boom therethrough, thereby decreasing the length of the boom's enclosure's perimeter. In essence, the retrieval means tightens the boom about the shrimp colony and in doing so concentrates the colony into an increasingly smaller spatial area. The tightening of the boom's perimetered enclosure causes the circumscribed shrimp colony to be forcedly driven to flow through the outlet port of that enclosure.

Positioned proximate or within that outlet port is a filtering means mounted on the boat and adapted for receiving the brine shrimp flow and separating the shrimp from the water by means of a net means which lifts the shrimp out of the water and places them in a storage container on the boat.

The invention provides a means of harvesting shrimp colonies located on the surface of a body of water remote from the shore of the body of water. The invention, in being adapted for spatially concentrating the shrimp colony and thereafter driving the colony through a spatially constricted outlet port, eliminates the need of depending on the wind or tide patterns for harvesting the shrimp. Since the harvesting is done on the open water, the need for leasing or owning shoreline is eliminated. This frees the shoreline for other uses.

The invention provides a means of physically removing and separating the shrimp from the water and thereafter placing the shrimp into storage containers. The invention eliminates the intensive human physical work involved in the conventional approach, i.e., to physically scoop the shrimp from the water or the shore by means of hand-held shovels or nets.

DETAILED DESCRIPTION OF THE DRAWING

Figure 1:
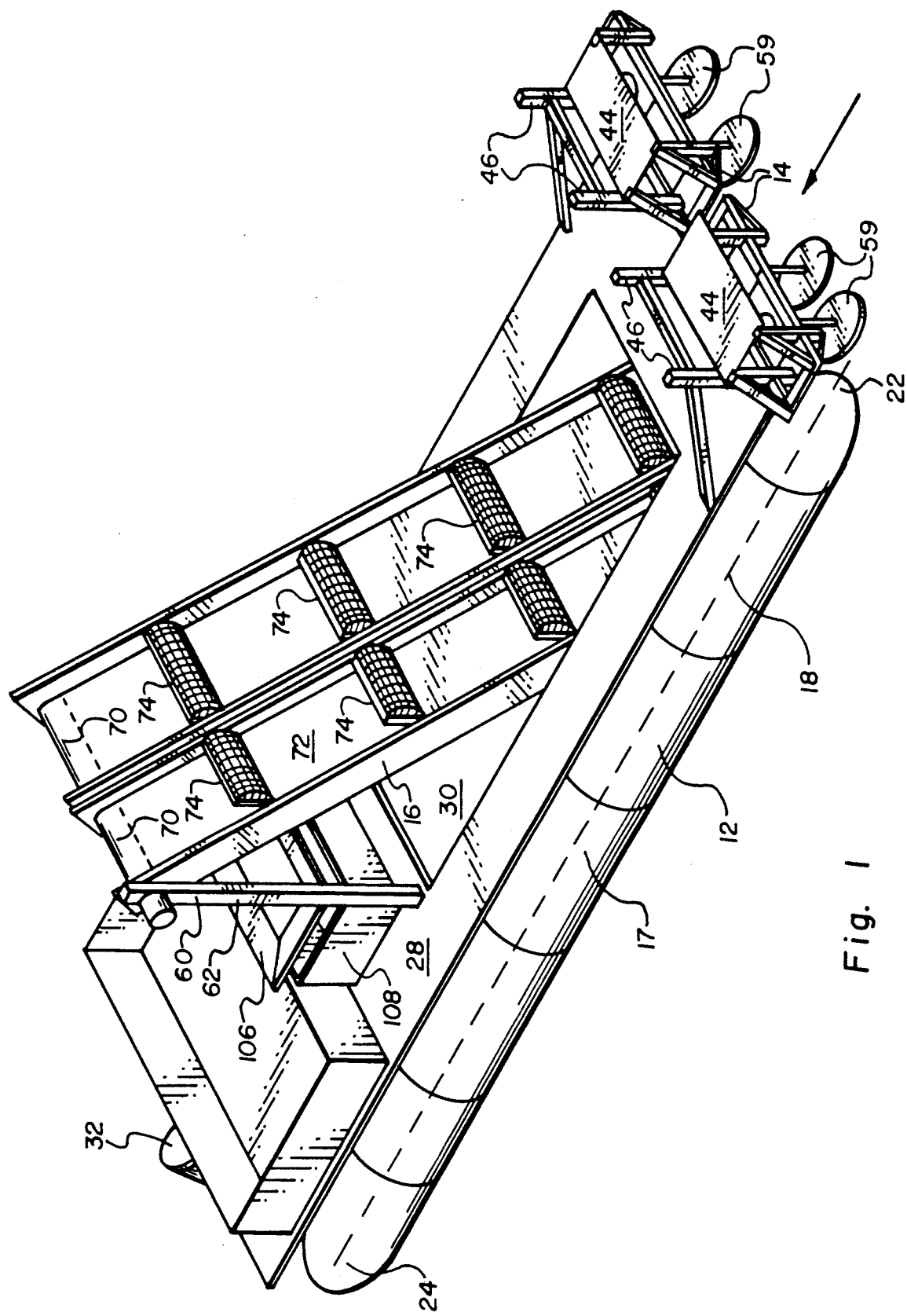
FIG. 1 is an elevated perspective view of the invention showing a boom retrieval means and filtering means mounted on a marine vessel.

A preferred embodiment of the invention is illustrated to advantage in FIGS. 1-9. As shown, a boat generally 12 is fitted with a boom retrieval means 14 and a filter means 16. The boat 12 is specifically adapted to position the boom retrieval means 14 such that the brine shrimp trapped by a boom may be driven into engagement with a filter means 16 by operation of the boom retrieval means 14.

The Boat

A boat 12 of a type suitable for use in the invention is shown as including a pair of elongate, generally cylindrical pontoons 17 positioned spatially apart from one another. The longitudinal axes 18 of the pontoons are oriented parallel one another. A channel 20 defined between the two pontoons extends from the front 22 of the pontoons 17 to the rear 24 of those pontoons. Mounted atop the pontoons 17 by means of a plurality of support members is a horizontally positioned flat, planar deck panel 28. The panel 28 defines a generally rectangular opening 30 therein which communicates directly with the channel 20 and the water found in that channel when the boat 12 is placed in water. The boat 12 is powered by a conventional motor 32 mounted on the stern.

The Boom Retrieval Means

Figure 3:
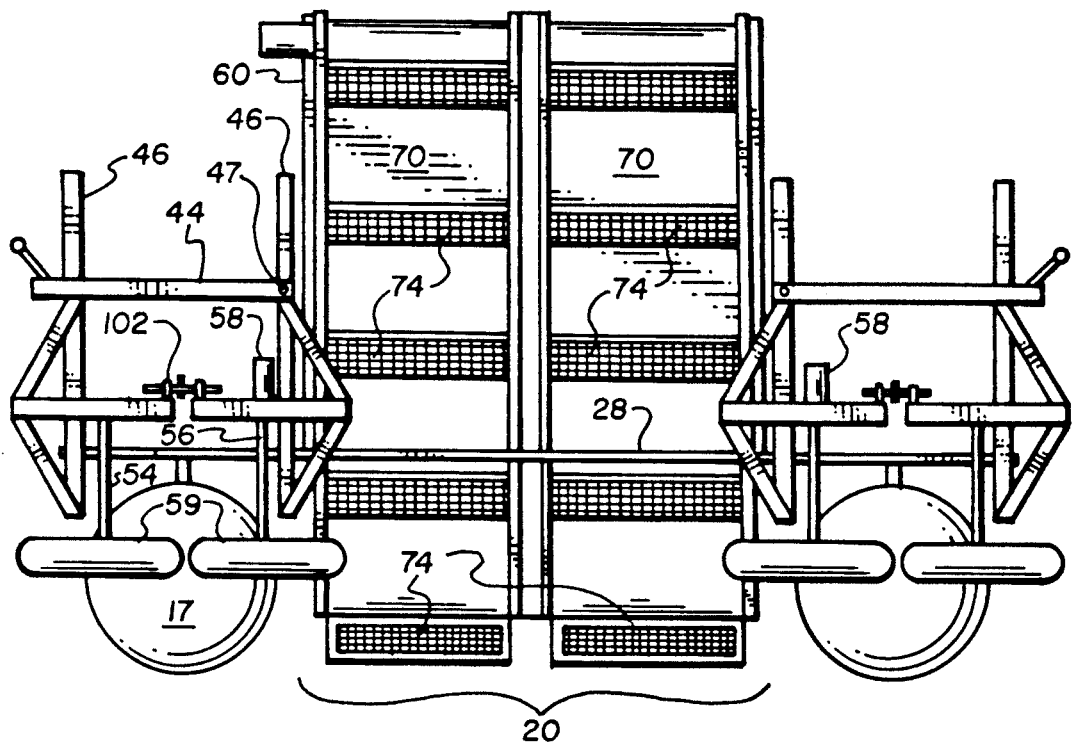
FIG. 3 is an elevational view of a boom retrieval means of the invention.

As shown in FIGS. 1 and 3, the boom retrieval means 14 is mounted on the bow of the boat 12 and is positioned on either side of the open channel 20 defined between the pontoons 17. The retrieval means 14 is adapted to engage and reel in a conventional boom 35 of the type utilized in containing oil spills. As shown to advantage in FIGS. 7 and 8, a boom includes an elongate cylindrical member 36 which is typically fabricated of a buoyant material such as styrofoam. Member 36 functions as a float and thereby keeps the boom 35 at a position at or proximate the surface of the water. Fixedly mounted to the lower surface of the member 36 is a sheet or apron of fabric or plastic 38. The apron extends downward approximately 12 inches. The sheet 38 is mounted to extend along the length of member 36 to form a curtain-like structure The material making up sheet 38 is of a sufficiently tight weave or otherwise presents a sufficiently non-porous construction that neither shrimp nor their eggs can readily pass therethrough. The sheet 38 essentially presents a solid wall to the brine shrimp so as to form a boundary wall for containing the shrimp. Mounted on sheet 38 proximate its lowest edge are weights 40, which may be fabricated from pieces of metal. Weights 40 function to urge the sheet 38 downward. Being placed at selected locations along the length of the sheet 38, the weights 40 cause the sheet 38 to assume a substantially vertical orientation along its length. Weights 40 may be adhered to the sheet by adhesives or alternatively may be contained within a pocket defined within the sheet 38 by the formation of a hem on the lowermost edge of the sheet 38. The boom 35 has two opposing ends 41 and 43, each of which may be fitted with an anchoring means, e.g. a conventional metal anchor, which permits the user to position one end of the boom and substantially retain that end in place while placing the remainder of the boom 35 about the periphery of a shrimp colony to be harvested.

The boom retrieval means 14 of the invention includes a pair of uprightly mounted assemblies 44. The assemblies 44 are essentially mirror reflections of one another, and therefore the following description will be limited to one of such assemblies, it being recognized that the other assembly would be essentially identical in structure.

Figure 2:
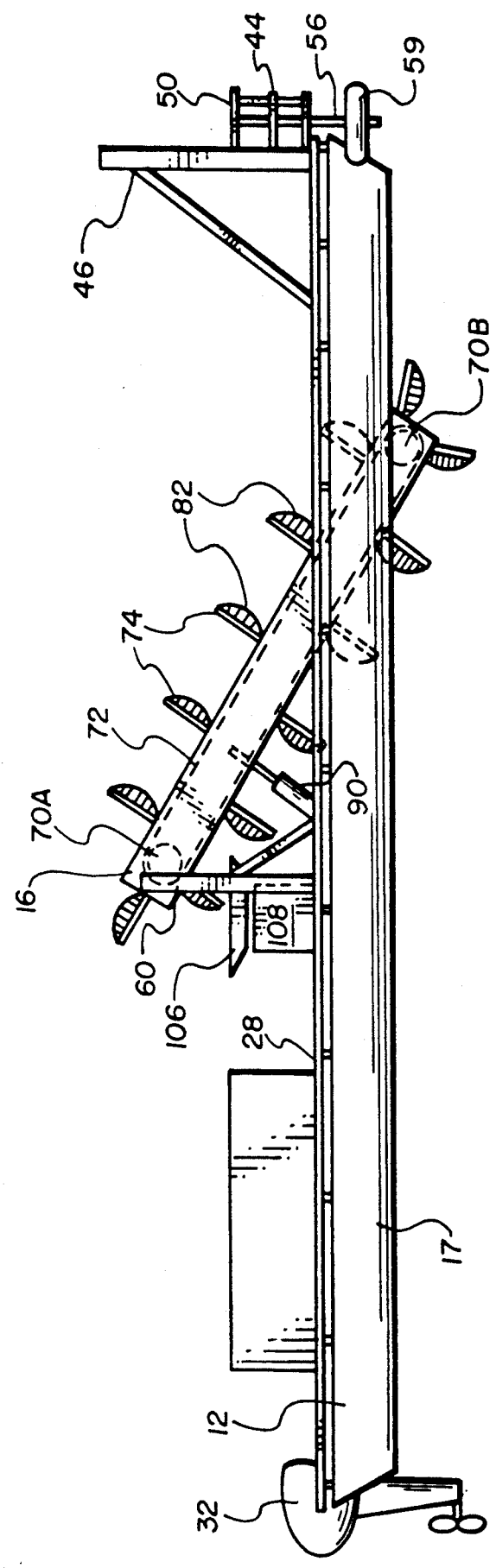
FIG. 2 is a side view of the invention of FIG. 1 showing a filtering means lowered into an operating position.

As shown, each assembly 44 includes an uprightly extending support assembly 46 which is mounted on the bow of boat 12. Extending horizontally outward from that assembly 46 is a support platform 50 (FIG. 2). The platform 50 is pivotedly mounted to one of the assembly 46 by a respective horizontally-oriented pivot shaft 47. Each platform is fitted with a pair of axle shafts 54 and 56. Axle shaft 54 is rotatingly supported on its platform 50 in bearings so as to be free-wheeling. The axle 56 is mounted to a hydraulic motor 58 which is mounted on platform 50. Mounted on the lowermost ends of each axle 54 and 56 is a respective roller 59. These rollers may be conventional treaded tires mounted for rotation about a vertical axis of rotation defined by each tire's respective axle. The circumferences of the two rollers 59 are positioned proximate or in contact one with another so as to permit a passage therebetween of the wall 38 of the boom 35. The boom is fed between the two rollers, e.g., while the motor is switched on. There is sufficient traction of the rollers 59 against the sheet 38 and engagement of those rollers 59 against the member 36 that the boom 35 is forcedly driven through the pair of aligned rollers 59 much as clothes are driven through the wringer of conventional washing machines.

In a preferred construction, the invention includes two such boom retrieval assemblies positioned spacedly apart from one another on the bow of a boat 12 as shown.

Figure 10:
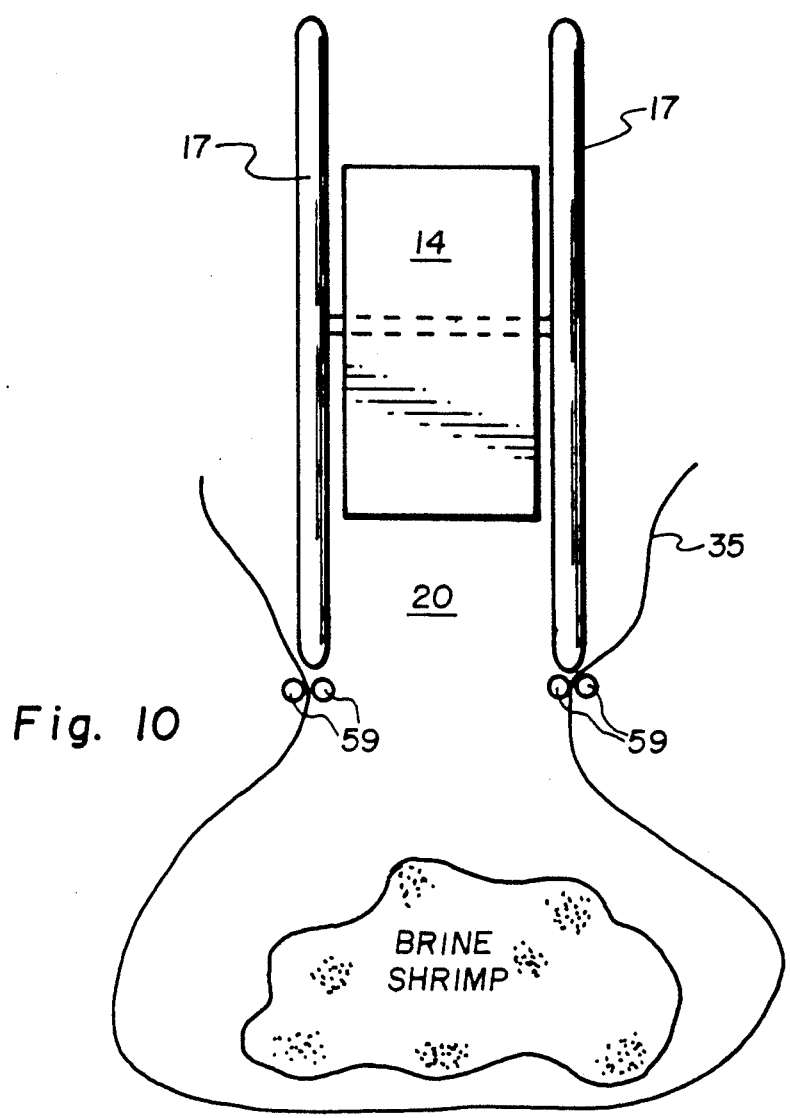
FIG. 10 is a top view of a boat fitted with a boom retrieval means engaging a boom positioned to circumscribe a shrimp colony floating on open water.
Figure 14:
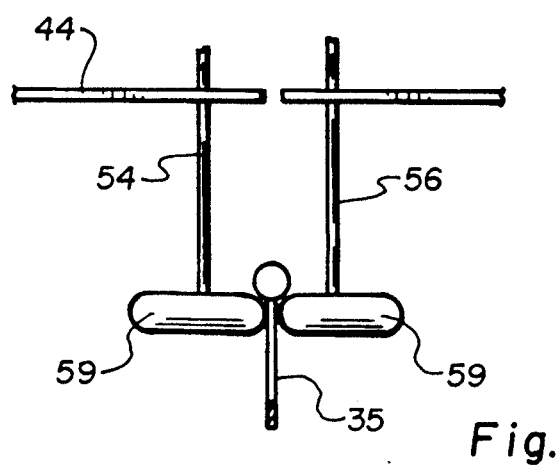
FIG. 14 is a front view of the rollers of the boom retrieval means shown engaging a boom.

When a boom 35 has been placed about a colony of shrimp, the ends of the boom 35 are brought into sufficient proximity to one another that a boat 12 of this invention may be brought into position and a respective end of the boom 35 is fed into each of the retrieval assemblies 44. The boom 35 being a continuous member forms a substantially closed perimetered enclosure when it is positioned about the shrimp colony to be harvested, as shown in FIG. 10. The space between the two ends of the boom forms an outlet port or exit for the shrimp confined within the boom formed enclosure. As previously stated, the two retrieval assemblies are positioned on opposite sides of and at the outlet of a channel 20 defined within the pair of pontoons 17. When the two hydraulic motors 58 are engaged, the opposing ends of the boom 35 are initially draw through their respective retrieval assemblies and then are directed outwardly along the respective sides of the boat. As the boom 35 continues to be drawn at each of its opposing ends through the two retrieval assemblies, the perimeter of the enclosure 51 formed by the boom 35 is dimensionally reduced resulting in a corresponding reduction in the area circumscribed by the enclosure. As the area within the enclosure 51 continues to be spatially reduced, the shrimp colony is not only spatially concentrated but, most importantly, the members of the colony are driven through the enclosure outlet port into channel 20. Eventually, substantially the entire contents of enclosure 51 are driven through the outlet and into the channel 20.

It should be recognized that the invention is also operable with the use of only one driven retrieval assembly. Stated otherwise, the user can equally anchor an end of the boom 35 to the boat or to the lake bed such that the boom end is positioned proximate the mouth of channel 20. The opposing end may then be fed into a driven retrieval assembly positioned proximate the opposing side of channel 20. As this driven retrieval assembly is activated, the enclosure is spatially reduced similarly to the operation previously discussed.

The Filtering Means

Mounted on boat 12, the filtering means 16 is adapted to remove the shrimp being driven through channel 20 by the action of the retrieval means. An apparatus suitable for performing this function is shown in FIGS. 1, 5, 8 and 9. As shown this means 16 includes a support assembly 60 mounted on the deck 28 to extend uprightly therefrom. The support assembly 60 is positioned proximate the opening 30 defined in the deck 28. The support assembly 60 may include a pair of spacedly positioned supports 62 having an axle 64 which extends therebetween. The axle 64 is journaled through block assemblies 66 mounted on the tops of support members 62. Axle 64 is likewise journaled through two pairs of elongate side panels 68. Each pair of panels 68 surrounds a conveyor belt assembly which includes a pair of spacedly positioned cylindrical drums 70 mounted for rotation. The superior driven drums 70A are mounted on axle 64 at the proximate end of side panels 68. The interior, non-driven drums are positioned proximate the distal end of the side panels 68. An endless belt 72 fabricated of a flexible material is trained over each pair of superior and inferior drums in a generally elliptical path. Mounted on each belt 72 at spaced intervals along that belt are a plurality of uprightly extending frame members 74. As shown, each of these frames members 74 is a rectangular member formed of a first portion of parallel elongate members 76 joined at their ends to a second pair of parallelly oriented elongate members 78 which are positioned orthogonal to the first pair of elongate members.

Each frame 74 defines a generally rectangular shaped opening 80 therein which passes throughout the entire thickness of the frame 74.

Mounted to the frame 74 is a net 82 which is positioned on the backside of the frame 74 so as to receive material which passes from the front of the frame 74 through opening 80.

Figure 4:
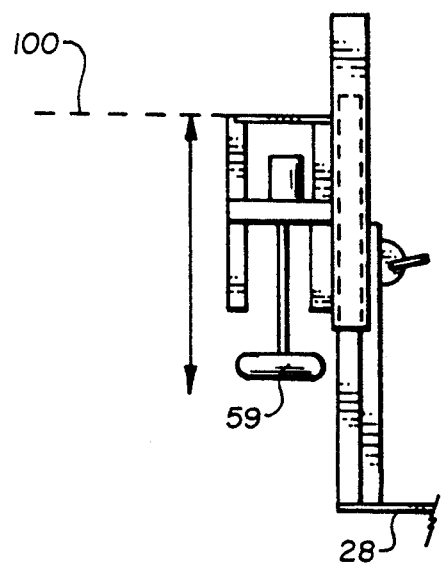
FIG. 4 is a side view of the boom retrieval means of FIG. 3.
Figures 6, 7:
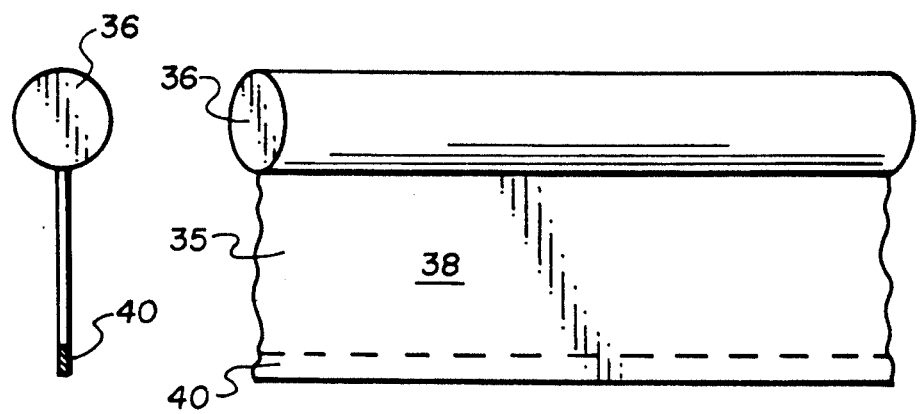
FIG. 6 is a side view of a boom structure usable in the invention.
FIG. 7 is an end view of the boom shown in FIG. 6.
Figure 5:
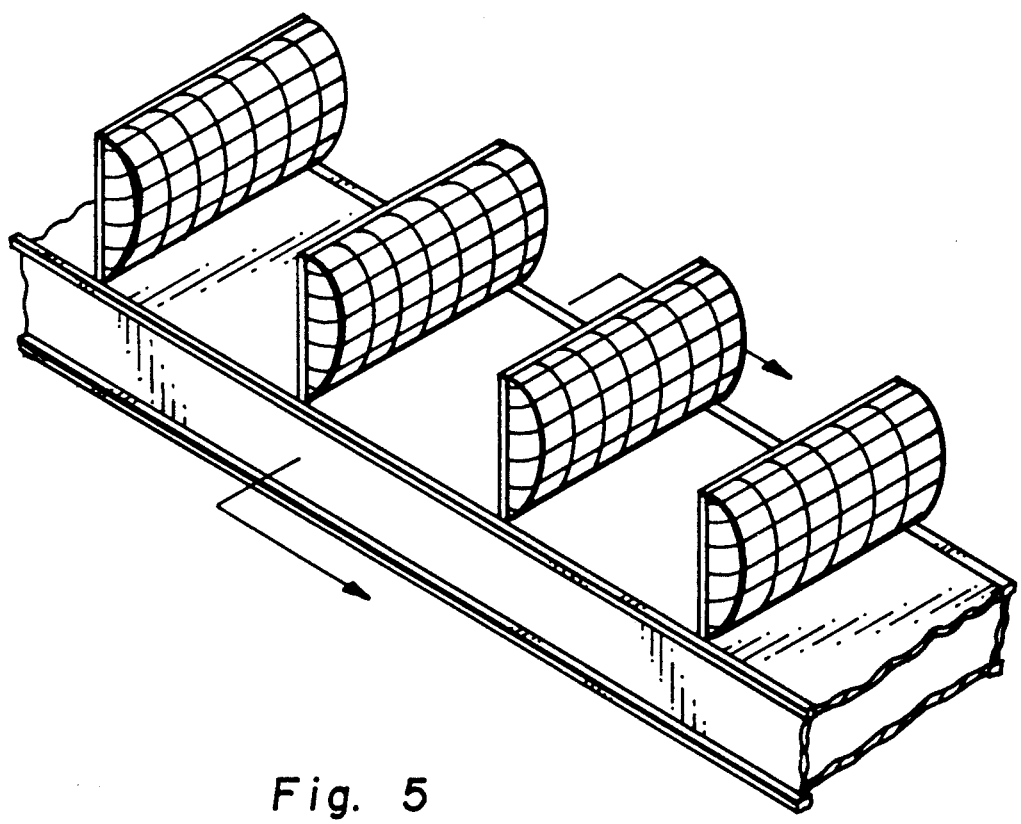
FIG. 5 is a sectional view of a conveyor belt of the filtering means of FIG. 2.
Figure 9:
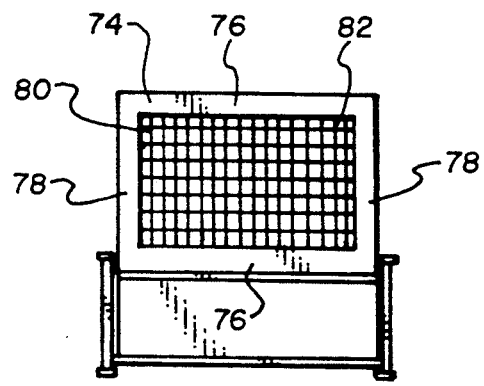
FIG. 9 is a front view of a conveyor belt frame.
Figure 8:
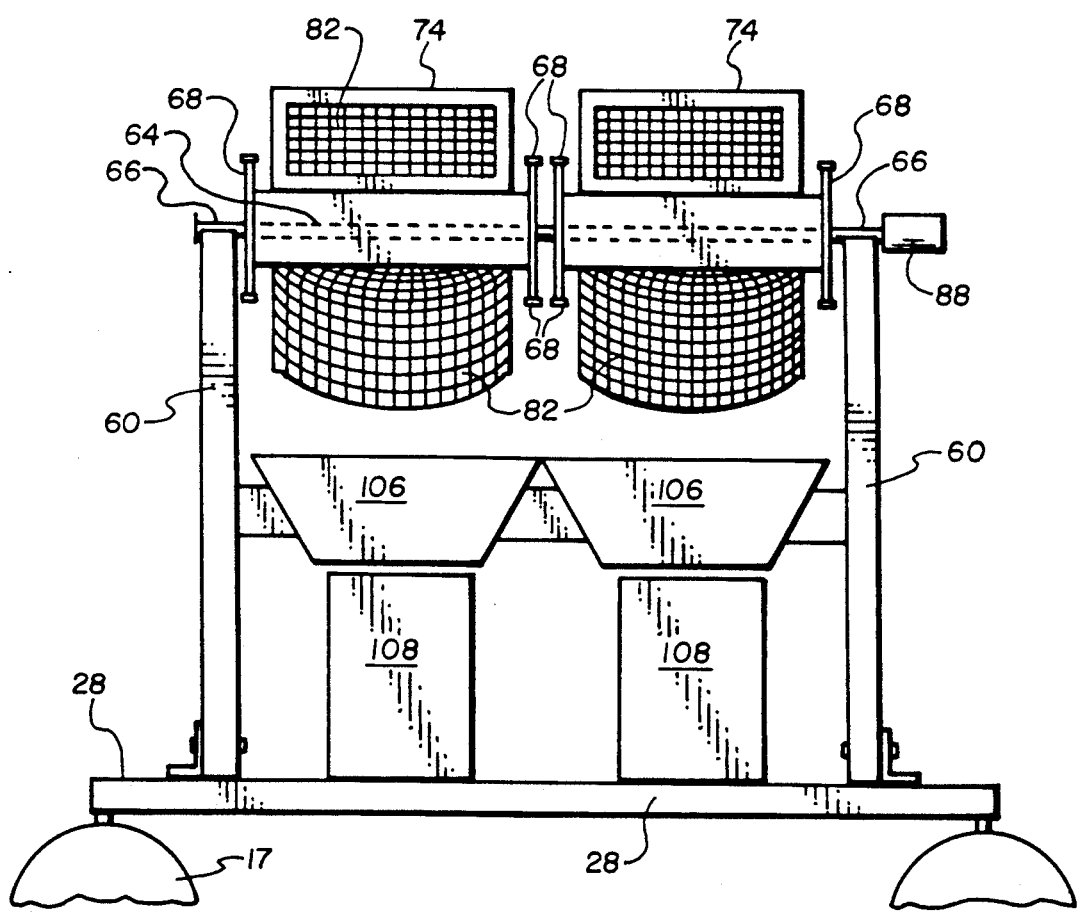
FIG. 8 is a rear view of the filtering means.
Figure 11:
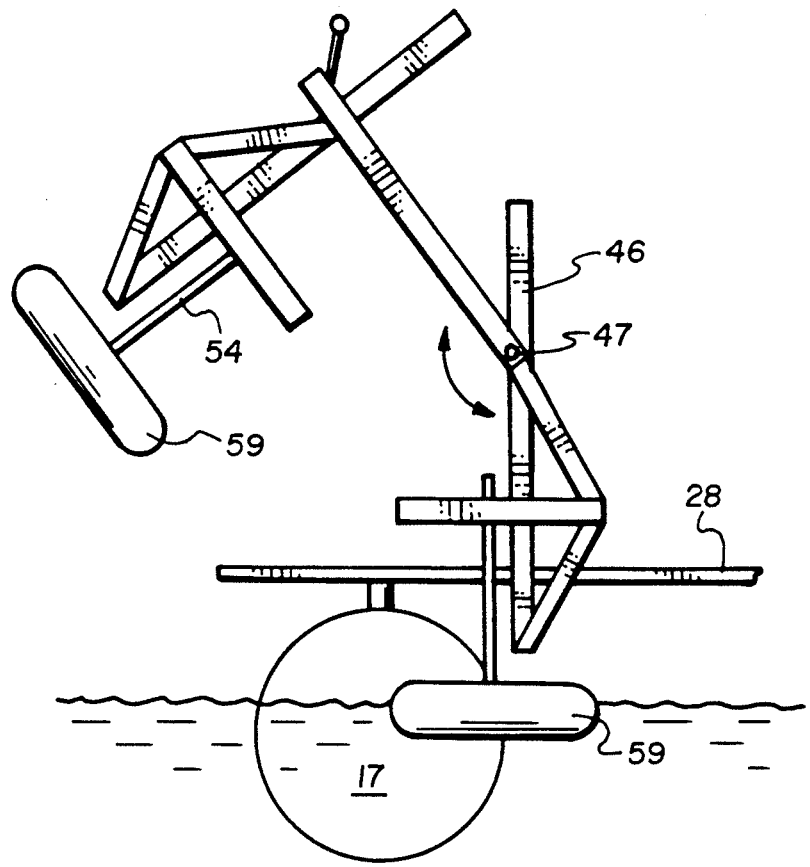
FIG. 11 is a front view of a boom retrieval means shown in a raised orientation.
Figure 13:
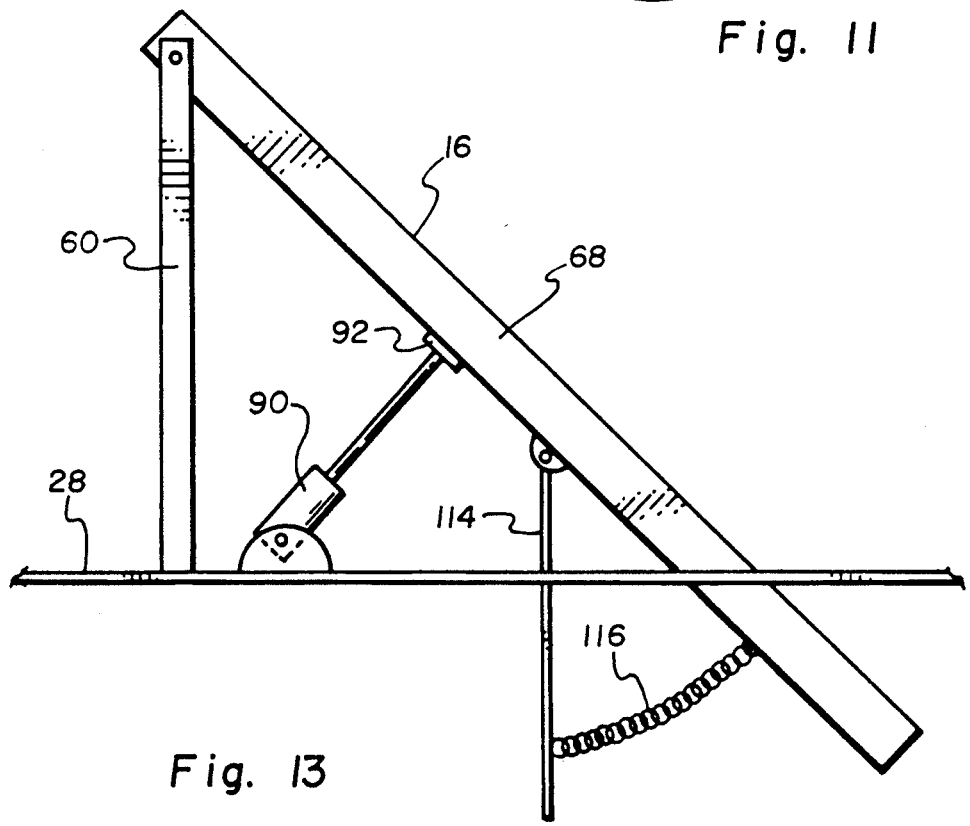
FIG. 13 is a side view of the filtering means showing a hydraulic ram fitted thereto and a barrier gate pivotedly mounted thereon.
Figure 15:
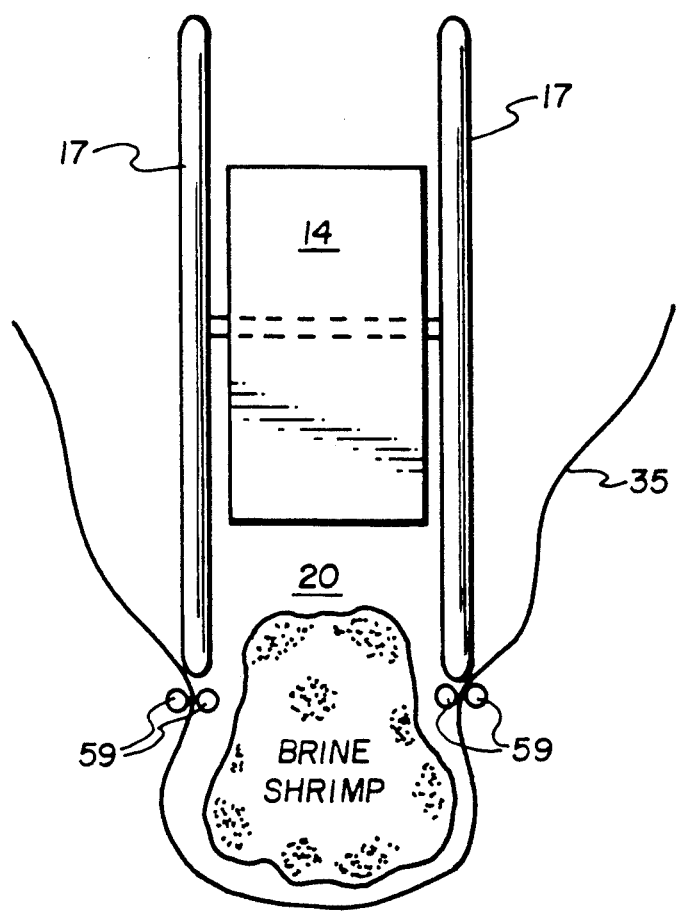
FIG. 15 is a top view of the boat and boom retrieval means shown in FIG. 10 showing the enclosure formed by the boom being spatially reduced by the operation of the boom retrieval means.

In one embodiment, the platform 50 is pivotally mounted on its respective supports 46. Utilizing the pivot, the user may rotate the platform about a pivot axis 100 thereby either bringing the rollers 59 put of the water by a clockwise rotation (see FIG. 11) or positioning the rollers 59 into the water by a counter clockwise rotation (See FIG. 11). The platform 50 may also be fitted with a jack 101 which is usable to elevate or lower the platform and its associated rollers. In this construction the platform 50 and the supports 46 form a telescope-like structure (FIG. 4).

Each pair of platforms 50 may be fitted with a conventional turnbuckle arrangement 102 which holds the platforms in a selected relationship vis-a-vis each other. This turnbuckle arrangement may be utilized to position the pairs of adjacent roller 59 closer or further apart from one another so as to adjust the pressure on the boom 35 fed through the interface of the rollers.

The apparatus and method of its operation is as follows. Upon the user discovering a colony of brine shrimp floating on the open water, a boat is dispatched carrying with it the boom 35. After approaching proximate the colony a first end of the boom is anchored in place by securing its anchor in the lake bed. The boat then navigates about the perimeter of the colony positioning the boom 35 about the perimeter of the colony as it travels. Eventually, the boat returns to the location of the anchored first end of the boom. The boom 35 now forms a substantially closed perimetered enclosure of the brine shrimp colony, the outlet port of that enclosure being defined between the first and second ends of the boom 35.

The boom retrieval assemblies of boat 12 are then lowered into the water and an end of the boom 35 is fed between a pair of rollers 59 of a respective retrieval assembly. The outlet port of the enclosure is now positioned at the mouth of the channel 20 defined between the pontoons 17 of boat 12. The distal end of the filter assembly 16 is then lowered into the water in channel 20 by activating ram 90 which rotates the filter assembly 16 about its axis of rotation 91. With the filter assembly 16 in position, hydraulic motor 93 is activated which in turn causes a counterclockwise travel of belts 72 about their respective drums 70. This in turn causes a counter clockwise travel of the net fitted frames 74, with each frame 74 being dragged through the channel 20, thereby forcing water through the opening 80 and thereafter through the net 82 of each frame 74. The frames then exit the water and are driven toward the stern along the upwardly inclined belt path. During this travel, water within the net formed pocket is drawn by gravity through the net fabric and eventually falls down and through opening 30 into channel 20. As the frame 74 reaches the upper end of the filter assembly the brine shrimp trapped within the fabric net pocket 82 are discharged as the net pocket is essentially inverted. Positioned directly below the upper end of the filter means 16 is a hopper 106 adapted to receive the falling shrimp and direct them into storage containers 108 positioned directly below the hopper 106.

When the boom retrieval means 14 is engaged, it begins to draw the boom toward the boat 12, which reduces the perimeter of the fencing enclosure defined by the boom. This reduction in enclosure perimeter causes the area defined within the enclosure to be spatially reduced. Resultingly, the shrimp colony is consolidated in size and further it is driven through the outlet port into channel 2 causing a flow in that channel in the direction indicated by arrow 110. With the filtering means 16 in operation., the brine shrimp driven through the channel 20 are filtered from the water by the net-fitted frames and thereafter deposited in the storage container 108.

The net 82 is mounted to the frame 74 about the entire perimeter of that frame so as to form a pocket about the frame, whereby the shrimp and water are driven through the opening 80 and thereafter into the pocket defined by the net. The net is fabricated of a material of sufficient porosity that water passes through it, but the shrimp including eggs are trapped within the pocket. The eggs are sufficiently large that they cannot pass through the ports of the net fabric. The net-fitted frames 74 are arranged on the two belts 72 such that the front face of the frames 74 on the upper run of the belt are oriented toward the stern of the boat 12. In the lower return run of the belt, the front faces of the frames 74 are oriented toward the bow of the boat 12. The driven drums 59A are driven by a hydraulic motor 88 mounted an axle 64. Use of a hydraulic motor 88 provides the user with the ability to control the speed of the conveyor belt responsive to the concentration of shrimp in the channel 20. The motor 88 has an infinite speed control range.

On the distal end of side panel members 68, each of the two adjoining pairs of side panels 68 are interconnected by an axle 89 which is journaled through each of the side panels 68. The axle 89 forms an axle for the non-driven conveyor belt drums 70B.

Mounted on the deck 28 of boat 12 proximate opening 30 is a hydraulic ram 90. The ram 90 extends upwardly and is angled to the horizon to engage a mounting bracket 92 which is mounted on the two innermost side panels 68. The side panels 68 being journaled on axle 64 are rotatably mounted together with the conveyor belts and drums about the horizontal axis 91 defined by axle 64. The ram 90 is operative to support the filter assembly 93 formed by the side panels 68, the belts 72 and the drums 70 and further to rotate the filter assembly 93 about axis 91. As shown to advantage in FIG. 1, the filter assembly is positioned over the opening 30 defined within deck 28. When the filter assembly is to be operated to filter the brine shrimp from the water in the channel 20, the ram 90 is operated to rotate the distal end 95 of the assembly clockwise about axis 91 thereby urging that end 95 through opening 30 and into the channel 20 sufficiently that upon a driven rotation of the conveyor belts, the net-fitted frames 74 are driven counterclockwise through the flow of shrimp being directed into channel 20 by the operation of the boom retrieval means 14. When the shrimp harvesting has been completed, the ram 90 is activated to rotate the filter assembly counterclockwise about its axis of rotation, thereby raising the distal end 95 of that assembly out of the water in channel 20 upward through opening 30 (see FIG. 11).

To aid in reducing drag on the boat during its travel, the boom retrieval assemblies 44 may also be fitted with means adapted for lifting them out of the water during periods of non-use. When the boat 12 is to navigate on the water, the user can utilize a pair of jacks 112 mounted on the supports 46 to raise each of the assemblies 44 upward out of contact with the water.

Figure 12:
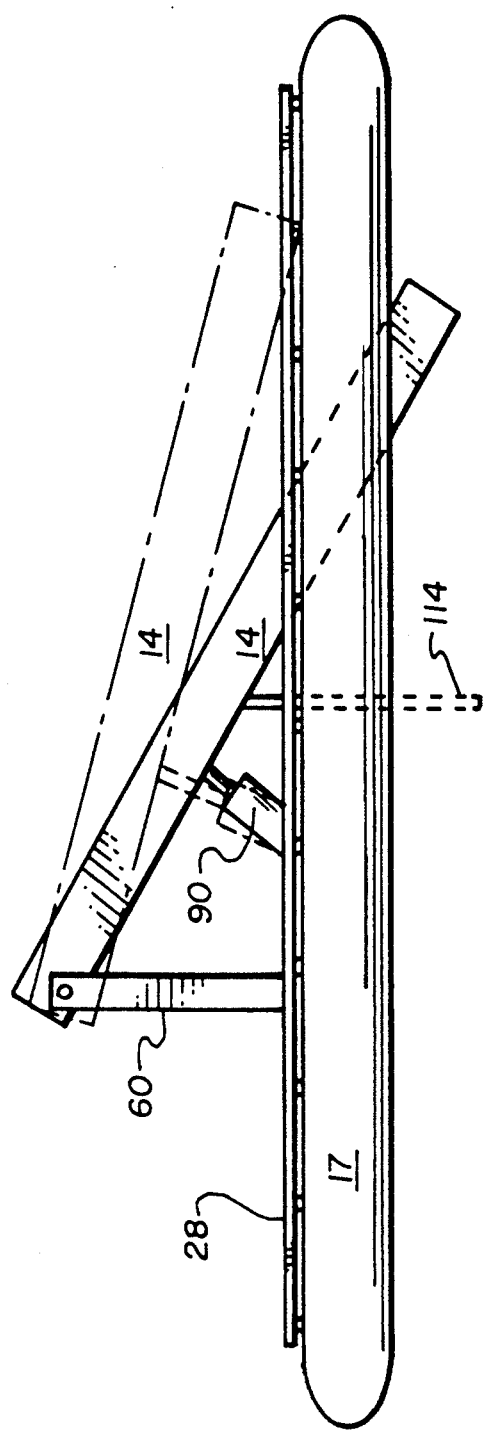
FIG. 12 is a side view of the filtering means shown in a raised and lowered condition, the raised condition being shown in hatched lines.

In order to optimize the operation of the apparatus, the filter assembly may be fitted with a means of closing the channel 20 after of the filter assembly. As shown in FIG. 12, a solid panel gate 114 is pivotedly mounted on the underside of the side panels 68 between the distal end of those panels and the mounting bracket 92 of the ram 90. A chain 116 is mounted on its first end to a side panel 68 or on its second end to the gate panel 114 so as to restrict its movement. The gate 114 is dimensioned to extend between the two pontoons to form a barrier across the complete width of channel 20.

Reference in the disclosure to details of the specific embodiments is not intended to restrict the scope of the appended claims, which themselves recite those features regarded as essential to the invention.

I claim:

1. An apparatus for harvesting shrimp from water, said apparatus comprising:
   an elongate floating boom positionable about a colony of shrimp to be harvested to form an enclosure about said colony of shrimp, said enclosure having an outlet, said boom comprising:
      a float means for retaining said boom proximate a surface level of said water,
      a substantially solid elongate sheet mounted on said float means, said sheet being adapted for vertically disposed positioning within water, and
      a weight means mounted on said sheet for urging said sheet into a vertically disposed orientation;
   a boat;
   a boom retrieval means mounted on said boat for engaging said boom and retrieving said boom, thereby decreasing a spatial area defined within said enclosure, said boom retrieval means being adapted for urging said shrimp, confined within said enclosure, through said enclosure outlet; and
   a filtering means; mounted on said boat and positionable proximate said enclosure outlet, for filtering shrimp exiting said enclosure outlet from said water and transferring said shrimp to a storage container on said boat.

2. The apparatus of claim 1 wherein said boom retrieval means comprises:
   a platform mounted on said boat;
   a pair of axles mounted on said platform;
   a pair of rollers, one of said rollers being mounted on each of said axles, said rollers being positioned adjacent one another, wherein said boom may be interposed between said rollers;
   a drive means mechanically associated with a first said axle for rotating said axle and its respective said roller;
   wherein said rollers are biasable against said interposed boom whereby a rotation of said first axle causes said boom to be drawn through said rollers.

3. The apparatus of claim 2 wherein said platform includes adjustment means for physically displacing one roller from another to permit said boom to be interposed between said rollers.

4. The apparatus of claim 3 wherein said platform includes a main assembly and a subassembly, said subassembly being pivotedly mounted to said main assembly, said subassembly having one of said axle roller assemblies mounted thereon.

5. The apparatus of claim 2 wherein said boom retrieval means includes an elevational means for elevationally raising and lowering said boom retrieval means.

6. The apparatus of claim 1 wherein said filtering means comprises:
- a support structure mounted on said boat;
- a pair of side frame members pivotedly mounted on said support structure;
- a pair of drums mounted rotatably and spacedly between said side frames;
- a drive means associated with at least one of said drums for rotating said drum;
- an endless belt trained over said drums;
- at least one frame member mounted on said belt; and
- a net mounted on said frame.

7. The apparatus of claim 6, wherein said filtering means comprises:
- a support means mounted on said boat;
- a pair of drums spacedly mounted on said support means;
- a drive means associated with at least one of said drums for rotating said drum;
- a belt trained about said drums to extend therebetween, said belt being rotatable about said drums in an endless path;
- a net means mounted on said belt for receiving and retaining a quantity of brine shrimp;
- wherein operation of said boom retrieval means drives said quantity of brine shrimp positioned within said boom enclosure into engagement with said net means of said belt, and upon a rotation of said belt, said brine shrimp being related within said net means and thereafter being removed from the water by said belt.

8. The apparatus of claim 7 wherein said boom control means comprises:
- a first pair of rollers, said rollers being positioned substantially adjacent one another and a first said roller being rotatingly driven by a drive means, said pair of rollers being adapted to receive said boom therebetween wherein a rotation of said first roller causes said boom to be forceably driven through said pair of rollers, causing a decrease in a length of a perimeter of said boom-formed enclosure.

9. The apparatus of claim 8 wherein said boom retrieval means includes a pair of second rollers, said second rollers being positioned substantially adjacent one another and at least one of said second rollers being rotatingly driven by a second drive means, said pair of second rollers being adapted to receive said boom therebetween wherein a rotation of said second roller driven by said second drive means causes said boom to be forcedly driven through said pair of second rollers, causing a decrease in a length of a perimeter of said boom-formed enclosure.

10. The apparatus of claim 7 wherein said support means is adapted for raising and lowering said drums, belt and drive means out of and into the water.

11. The apparatus of claim 7 wherein said net means comprises:
- an upright frame defining an opening therein; and
- a mesh net mounted on said frame about said opening being oriented to receive and filter brine shrimp from water flowing through said opening.

* * * * *